(12) United States Patent
Wagoner et al.

(10) Patent No.: US 10,574,162 B1
(45) Date of Patent: Feb. 25, 2020

(54) DYNAMIC BRAKE CIRCUIT ASSEMBLY FOR A WIND TURBINE

(71) Applicant: General Electric Company, Schenectady, NY (US)

(72) Inventors: Robert Gregory Wagoner, Roanoke, VA (US); Cornelius Edward Holliday, Forest, VA (US); Benjamin Arthur Niemoeller, Roanoke, VA (US); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/113,213

(22) Filed: Aug. 27, 2018

(51) Int. Cl.
*H02P 9/08* (2006.01)
*H02M 5/458* (2006.01)
*H02M 1/36* (2007.01)
*F03D 1/00* (2006.01)
*F03D 7/02* (2006.01)
*F03D 17/00* (2016.01)
(Continued)

(52) U.S. Cl.
CPC ............. *H02P 9/08* (2013.01); *F03D 1/00* (2013.01); *F03D 7/0244* (2013.01); *F03D 9/255* (2017.02); *F03D 17/00* (2016.05); *H02M 1/36* (2013.01); *H02M 5/4585* (2013.01); *H02P 9/007* (2013.01); *H02P 9/305* (2013.01); *F05B 2220/30* (2013.01); *F05B 2220/70646* (2013.01); *F05B 2260/903* (2013.01); *F05B 2270/1011* (2013.01); *F05B 2270/337* (2013.01); *F05B 2270/402* (2013.01); *F05B 2270/502* (2013.01); *F05B 2270/602* (2013.01); *H02P 2101/15* (2015.01)

(58) Field of Classification Search
CPC .. H02P 9/08; H02P 9/007; H02P 9/305; H02P 2101/15; F03D 17/00; F03D 9/255; F03D 1/00; F03D 7/0244; H02M 1/36; H02M 5/4585; F05B 2220/30; F05B 2220/70646; F05B 2260/903; F05B 2270/1011; F05B 2270/337; F05B 2270/402; F05B 2270/502; F05B 2270/602
See application file for complete search history.

(56) References Cited

U.S. PATENT DOCUMENTS 5,907,192 A * 5/1999 Lyons ................... F03D 7/0224
  290/42
6,396,137 B1 * 5/2002 Klughart ................. H01L 25/16
  257/691
(Continued)

FOREIGN PATENT DOCUMENTS

WO WO2017/108046 A1 6/2017

*Primary Examiner* — Tulsidas C Patel
*Assistant Examiner* — Joseph Ortega
(74) *Attorney, Agent, or Firm* — Dority & Manning, P.A.

(57) ABSTRACT

A power converter assembly for an electrical power system connected to a power grid includes a rotor-side converter configured for coupling to a generator rotor of a generator of the electrical power system, a line-side converter electrically coupled to rotor-side converter via a DC link, and a dynamic brake assembly electrically coupled to the DC link. The line-side converter is configured for coupling to the power grid. The dynamic brake assembly includes a plurality of switching devices connected in parallel and a plurality of inductors electrically coupled between the plurality of switching devices.

20 Claims, 9 Drawing Sheets

(51) Int. Cl.
  *F03D 9/25* (2016.01)
  *F03D 9/00* (2016.01)
  *H02P 101/15* (2016.01)
  *H02P 9/30* (2006.01)
  *H02P 9/00* (2006.01)

(56) References Cited

U.S. PATENT DOCUMENTS

| | | | | |
|---|---|---|---|---|
| 7,423,412 | B2* | 9/2008 | Weng | H02P 9/007 |
| | | | | 322/20 |
| 7,545,052 | B2* | 6/2009 | Llorente Gonzalez | |
| | | | | H02J 3/386 |
| | | | | 290/44 |
| 7,629,705 | B2* | 12/2009 | Barker | H02P 9/007 |
| | | | | 290/55 |
| 7,859,125 | B2* | 12/2010 | Nielsen | F03D 7/0272 |
| | | | | 290/44 |
| 8,080,973 | B2* | 12/2011 | King | H02J 7/0045 |
| | | | | 320/104 |
| 8,664,788 | B1* | 3/2014 | Wagoner | F03D 7/0244 |
| | | | | 290/44 |
| 8,698,451 | B2* | 4/2014 | King | B60L 7/12 |
| | | | | 320/109 |
| 9,030,174 | B2* | 5/2015 | Wagoner | H02M 7/53871 |
| | | | | 290/44 |
| 9,099,933 | B2* | 8/2015 | Jones | H02M 5/42 |
| 9,263,962 | B2* | 2/2016 | Yang | H02M 5/42 |
| 9,450,415 | B2* | 9/2016 | Larsen | H02J 3/386 |
| 9,496,813 | B2* | 11/2016 | Gupta | F03D 7/0224 |
| 2007/0177314 | A1* | 8/2007 | Weng | H02P 9/007 |
| | | | | 361/20 |
| 2007/0279815 | A1* | 12/2007 | Li | F03D 7/0248 |
| | | | | 361/54 |
| 2010/0140939 | A1* | 6/2010 | Scholte-Wassink | |
| | | | | F03D 7/0224 |
| | | | | 290/44 |
| 2010/0156192 | A1* | 6/2010 | Wang | H02J 3/01 |
| | | | | 307/82 |
| 2010/0181829 | A1* | 7/2010 | Ichikawa | H01M 10/425 |
| | | | | 307/9.1 |
| 2011/0140430 | A1* | 6/2011 | Ritter | H02J 3/386 |
| | | | | 290/44 |
| 2012/0133343 | A1* | 5/2012 | Grbovic | H02P 3/18 |
| | | | | 322/21 |
| 2013/0249501 | A1* | 9/2013 | Lu | F03D 7/0224 |
| | | | | 322/21 |
| 2013/0250636 | A1* | 9/2013 | Arimura | H02M 7/797 |
| | | | | 363/78 |
| 2014/0203559 | A1* | 7/2014 | Wagoner | H02M 5/4585 |
| | | | | 290/44 |
| 2014/0265979 | A1* | 9/2014 | Xu | H02P 6/12 |
| | | | | 318/478 |
| 2014/0361538 | A1* | 12/2014 | Wagoner | H02P 3/22 |
| | | | | 290/44 |
| 2015/0131349 | A1* | 5/2015 | El-Barbari | H02M 1/088 |
| | | | | 363/131 |
| 2015/0188468 | A1* | 7/2015 | Xu | H02P 9/007 |
| | | | | 290/44 |
| 2015/0214830 | A1* | 7/2015 | Harbourt | H02M 1/088 |
| | | | | 318/500 |
| 2015/0311696 | A1* | 10/2015 | Zhu | H02H 7/06 |
| | | | | 361/21 |
| 2015/0372481 | A1* | 12/2015 | Roesner | H02H 7/1216 |
| | | | | 361/18 |
| 2016/0118786 | A1* | 4/2016 | Zhu | F03D 7/0244 |
| | | | | 290/44 |
| 2016/0128231 | A1* | 5/2016 | Wagoner | H05K 7/203 |
| | | | | 165/104.31 |
| 2016/0165684 | A1* | 6/2016 | Ramabhadran | H05B 33/0815 |
| | | | | 315/186 |
| 2016/0197559 | A1* | 7/2016 | Tan | H02P 9/007 |
| | | | | 363/35 |
| 2016/0268949 | A1* | 9/2016 | Benn | H02P 27/06 |
| 2016/0333856 | A1* | 11/2016 | Zabalza | H02H 7/06 |
| 2016/0359365 | A1* | 12/2016 | Schroeder | H02J 3/36 |
| 2017/0077746 | A1* | 3/2017 | Kanakasabai | H02J 9/061 |
| 2017/0163043 | A1* | 6/2017 | Garces | H02J 3/387 |
| 2017/0211640 | A1* | 7/2017 | Pearce | F16D 63/002 |
| 2017/0214310 | A1* | 7/2017 | Zhang | H02M 7/487 |
| 2017/0214335 | A1* | 7/2017 | Basic | H02M 7/48 |
| 2017/0257046 | A1* | 9/2017 | Schnetzka | H02P 9/42 |
| 2017/0274776 | A1* | 9/2017 | Xu | B60L 50/10 |
| 2018/0167013 | A1* | 6/2018 | Xu | H03K 17/14 |
| 2018/0346104 | A1* | 12/2018 | Durkee | B60T 8/1703 |
| 2018/0354371 | A1* | 12/2018 | Malek | B60L 11/18 |
| 2018/0366970 | A1* | 12/2018 | Zhou | H02J 1/08 |
| 2019/0061537 | A1* | 2/2019 | Ge | B60L 53/24 |
| 2019/0097551 | A1* | 3/2019 | Nagarajan | H02P 3/26 |
| 2019/0149145 | A1* | 5/2019 | Yang | H03K 17/0828 |
| | | | | 318/139 |

* cited by examiner

DYNAMIC BRAKE CIRCUIT ASSEMBLY FOR A WIND TURBINE

FIELD

The present disclosure relates generally to wind turbines and, more particularly, to improved dynamic brake circuit assemblies for wind turbines.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. Thus, the main transformer steps up the voltage amplitude of the electrical power such that the transformed electrical power may be further transmitted to the power grid.

In many wind turbines, the generator may be electrically coupled to a bi-directional power converter that includes a rotor-side converter joined to a line-side converter via a regulated DC link. Further, wind turbine power systems may include a variety of generator types, including but not limited to a doubly-fed induction generator (DFIG).

DFIG operation is typically characterized in that the rotor circuit is supplied with current from a current-regulated power converter. As such, the power converter can provide nearly instantaneous regulation of its output currents with respect to the grid frequency. Under steady operating conditions, the rotor-side converter controls the magnitude and phase of currents in the rotor circuit to achieve desired values of electromagnetic torque. Reactive power flow into the line-connected stator terminals of the generator can also be controlled.

Such DFIG wind turbines may or may not be equipped with a dynamic brake that includes parallel insulated-gate bipolar transistors (IGBTs) which feed power into a resistor. Minimum components for the dynamic brake typically include a switch (typically a semiconductor such as an IGBT) and a resistor and may also include one or more diode(s) in parallel with either the switch, the resistor, or both, as well as other components. Without dynamic braking, typical operation of a DFIG wind turbine is configured to regulate the positive sequence voltage with a closed-loop current regulation scheme which minimizes negative sequence current. As the length of the transmission line feeder to the DFIG wind turbine is increased, however, response to grid transients and grid disturbances causes oscillations of power into and out of the power converter, which can create disturbances on the DC bus voltage therein. As longer transmission line length is typically desired (and possibly coupled with larger grid voltage transients), the voltage overshoots on the DC bus voltage in the power converter may reach a level that damages the converter components. Thus, the dynamic brake may be used to control the peak voltage on the DC bus.

For conventional dynamic brakes, controls for the switch may be operated based solely on the level of the DC bus voltage in the power converter. As converter power levels continue to increase, additional IGBTs must be placed in parallel to conduct the current. Therefore, it is important to balance the loss in the parallel IGBTs because the loss directly impacts the junction temperature, and the IGBT with the highest junction temperature is the limit in the total energy that can be fed into the resistor.

Thus, the present disclosure is directed to an improved dynamic brake circuit assembly for a wind turbine that addresses the aforementioned issues.

BRIEF DESCRIPTION

Aspects and advantages of the invention will be set forth in part in the following description, or may be obvious from the description, or may be learned through practice of the invention.

In one aspect, the present subject matter is directed to a power converter assembly for an electrical power system connected to a power grid. The power converter assembly includes a rotor-side converter configured for coupling to a generator rotor of a generator of the electrical power system, a line-side converter electrically coupled to rotor-side converter via a DC link, at least one sensor configured to monitor at voltage parameter of the DC link, and a dynamic brake assembly electrically coupled to the DC link. The line-side converter is configured for coupling to the power grid. The dynamic brake assembly includes a plurality of switching devices connected in parallel and a plurality of inductors electrically coupled between the plurality of switching devices. Thus, when the voltage parameter is at or above a voltage threshold, the dynamic brake assembly is configured to turn on such that the plurality of inductors receives at least part of a load generated by the power converter assembly.

In one embodiment, the dynamic brake assembly may include at least one resistor electrically coupled to a node positioned between the plurality of inductors. In another embodiment, the resistor(s) may include a split resistor.

In further embodiments, the plurality of switching devices may be arranged in a plurality of pairs of switching devices connected in parallel. In such embodiments, each of the plurality of inductors may be connected to nodes between first and second switching devices of each of the plurality of pairs of switching devices.

In additional embodiments, each of the plurality of inductors may be connected in parallel with the resistor(s). In alternative embodiments, the dynamic brake assembly may include a plurality of resistors. In such embodiments, each of the plurality of resistors may be connected in series with one of the plurality of inductors between the plurality of switching devices to form a plurality of dynamic brake circuits.

In several embodiments, the dynamic brake assembly may further include at least one snubber capacitor electrically coupled between the plurality of dynamic brake circuits. In such embodiments, the dynamic brake assembly may include at least one additional resistor connected in series with the snubber capacitor. In another embodiment, the dynamic brake assembly may include at least one additional resistor connected in parallel with the snubber capacitor.

In certain embodiments, the plurality of switching devices may be insulated-gate bipolar transistors (IGBTs). In additional embodiments, the electrical power system may be part of a wind turbine power system. In another embodiment, the generator may be a doubly-fed induction generator (DFIG).

In another aspect, the present disclosure is directed to a power converter assembly for an electrical power system connected to a power grid. The power converter assembly includes a rotor-side converter configured for coupling to a generator rotor of a generator of the electrical power system, a line-side converter electrically coupled to rotor-side converter via a DC link, at least one sensor configured to monitor at voltage parameter of the DC link, and a dynamic brake assembly electrically coupled to the DC link. The line-side converter is configured for coupling to the power grid. The dynamic brake assembly includes a plurality of switching devices connected in parallel and at least one resistance-inductance component electrically coupled between the plurality of switching devices. Thus, when the voltage parameter is at or above a voltage threshold, the dynamic brake assembly is configured to turn on such that the resistance-inductance component receives at least part of a load generated by the power converter assembly. It should be understood that the power converter may further include any of the additional features as described herein.

In yet another aspect, the present disclosure is directed to a method for controlling peak voltage of a DC link of a power converter of an electrical power system connected to a power grid with minimal switching losses. The method includes electrically coupling a dynamic brake assembly to a DC link of the power converter. The dynamic brake includes a plurality of switching devices connected in parallel and a plurality of inductors electrically coupled between the plurality of switching devices. The method also includes receiving a voltage measurement of the DC link of the power converter. Further, the method includes comparing the voltage measurement of the DC link to a voltage threshold. When the voltage measurement is at or above the voltage threshold, the method includes turning on the dynamic brake assembly of the power converter such that the at least one inductor receives at least part of a load generated by the power converter.

In one embodiment, the method may include applying hysteresis to the voltage measurement. In another embodiment, the step of turning on the dynamic brake assembly of the power converter may include determining at least one gating command for each of the plurality of switching devices. More specifically, in certain embodiments, the step of determining the gating command(s) for each of the plurality of switching devices may include time-shifting on-delays and off-delays of the plurality of switching devices to optimize sharing of a load between the plurality of switching devices.

In further embodiments, as mentioned, the dynamic brake assembly may include a plurality of resistors and a plurality of inductors coupled between the plurality of switching devices, with each of the plurality of resistors connected in series with one of the plurality of inductors to form a plurality of dynamic brake circuits. In such embodiments, the dynamic brake assembly may also include at least one snubber capacitor coupled between the plurality of dynamic brake circuits. Thus, in particular embodiments, the step of determining the gating command(s) for each of the plurality of switching devices may include simultaneously turning on the plurality of switching devices to optimize sharing of a load between the plurality of switching devices and time-shifting turn-off commands for the plurality of switching devices such that each switching device turns off at a different time. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
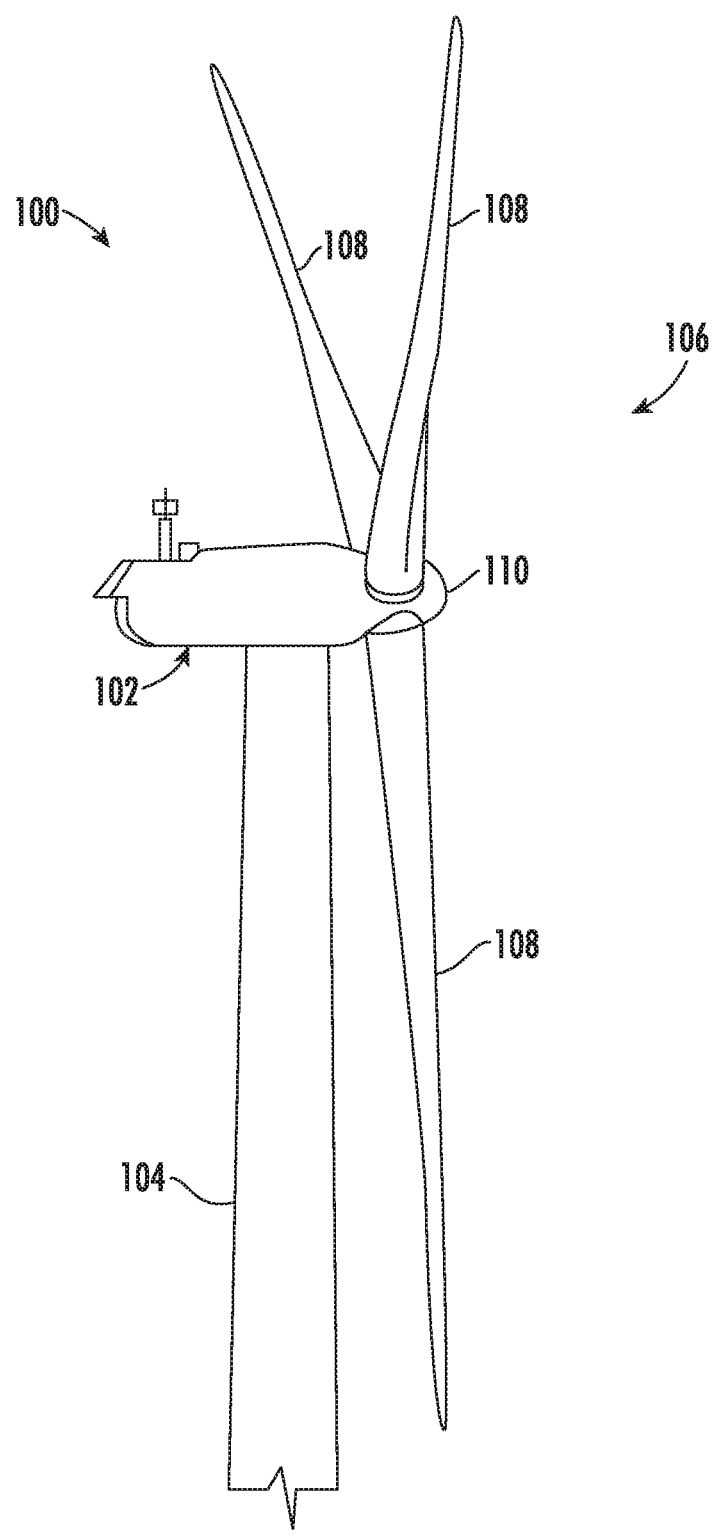
FIG. 1 illustrates a perspective view of a portion of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a portion of one embodiment of a wind turbine 100 according to the present disclosure that is configured to implement the method as described herein. As shown, the wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
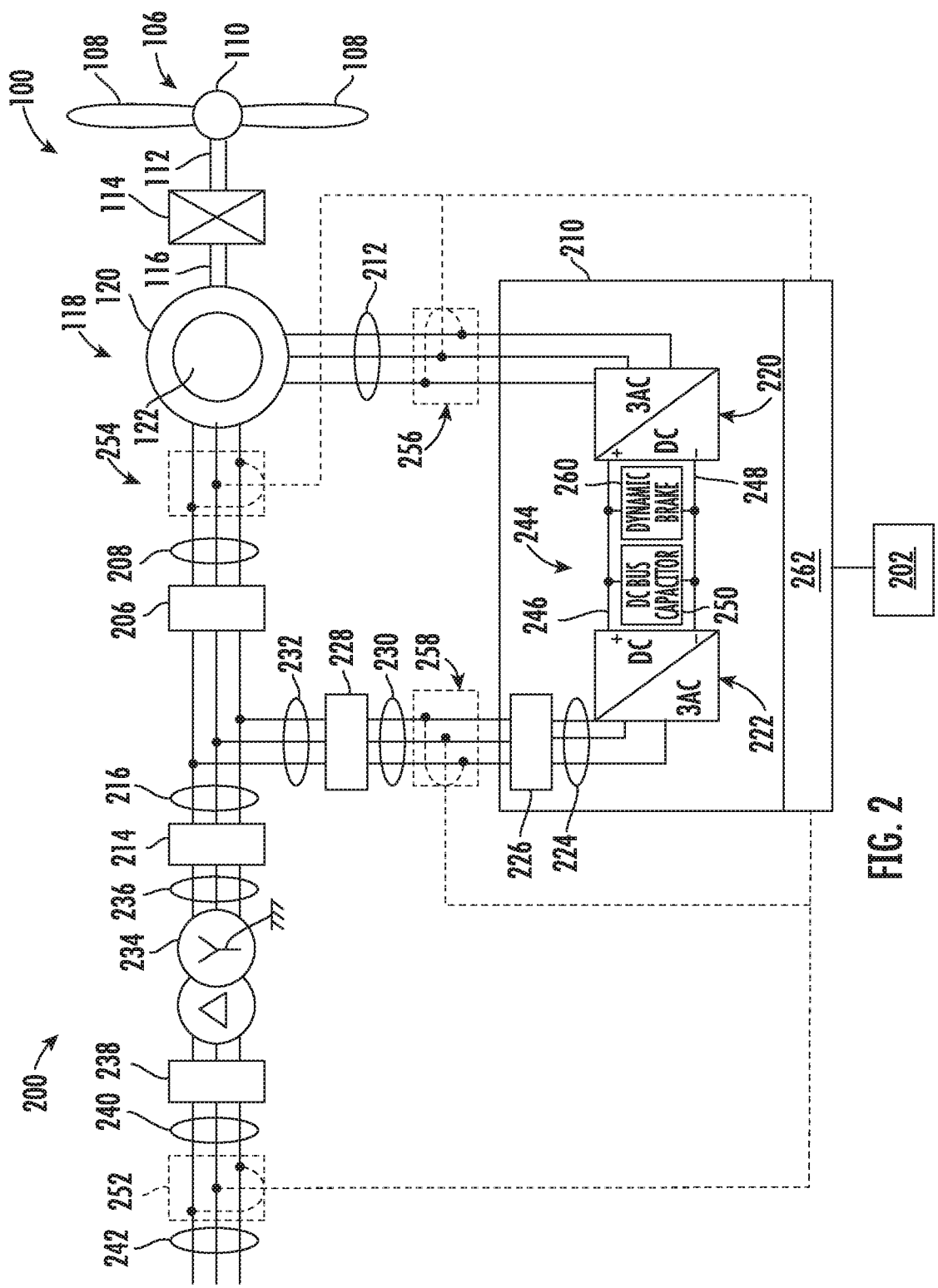
FIG. 2 illustrates a schematic view of one embodiment of an electrical power system suitable for use with the wind turbine shown in FIG. 2.

Referring to FIG. 2, a schematic view of one embodiment of an electrical power system 200 that may be used with the wind turbine 100 is illustrated. It should be understood that FIG. 2 is provided as an example embodiment only and is not meant to be limiting. More specifically, as shown, the electrical power system corresponds to a doubly-fed induction generator (DFIG) power system. In alternative embodiments, however, the electrical power system 200 may correspond to a full power conversion system.

During operation, wind impacts the rotor blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, DFIG that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

Figure 3:
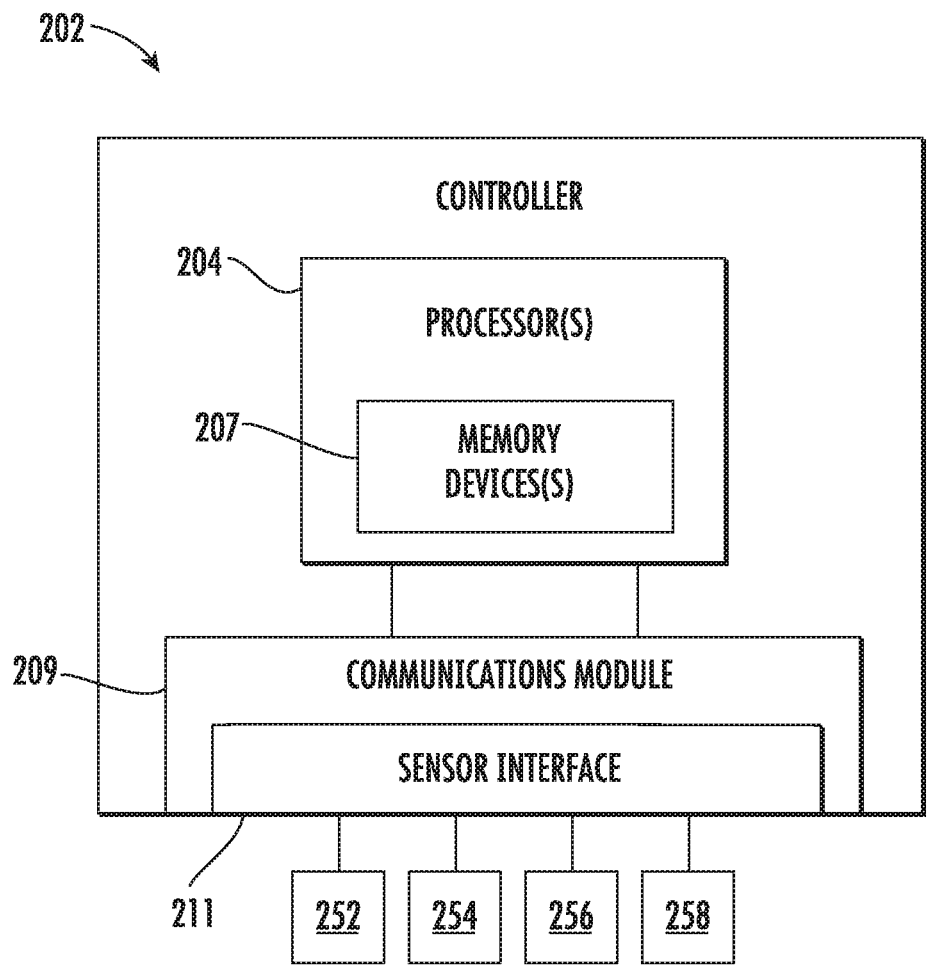
FIG. 3 illustrates a block diagram of one embodiment of a controller suitable for use with the wind turbine shown in FIG. 2.

In addition, the electrical power system 200 may include a wind turbine controller 202 configured to control any of the components of the wind turbine 100 and/or implement the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors 252, 254, 256, 258.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via the stator bus 208. In one embodiment, the generator rotor 122 may be electrically coupled to a bi-directional power converter assembly 210 or power converter via a rotor bus 212. Alternatively, the generator rotor 122 may be electrically coupled to the rotor bus 212 via any other device that facilitates operation of electrical power system 200 as described herein. In a further embodiment, the stator synchronizing switch 206 may be electrically coupled to the main transformer circuit breaker 214 via the system bus 216.

In addition, as shown, the power converter assembly 210 (also referred to herein as a power converter) may include a rotor-side power converter 220 electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, the line-side power converter 222 may be electrically coupled to a line bus 224 that includes a line contactor 226. In addition, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via the breaker-side bus 240. In addition, as shown, the grid circuit breaker 238 may be connected to the electric power transmission and distribution grid via the grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power converter assembly 210. The rotor-side power converter 220 converts the AC power provided from the rotor bus 212 into DC power and provides the DC power to the DC link 244. Switching elements (e.g. IGBTs) used in bridge circuits of the rotor-side power converter 220 can be modulated to convert the AC power provided from the rotor bus 212 into DC power suitable for the DC link 244. In addition, as shown, the power converter assembly 210 may also include a dynamic brake assembly 260 electrically coupled between the rotor-side converter 220 and the line-side converter 222, which will be discussed in more detail below in reference to FIGS. 4-11.

Still referring to FIG. 2, the line-side converter 222 converts the DC power on the DC link 244 into AC output power suitable for the electrical grid bus 242. In particular, switching elements (e.g. IGBTs) used in bridge circuits of the line-side power converter 222 can be modulated to convert the DC power on the DC link 244 into AC power on the line-side bus 225. The AC power from the power converter assembly 210 can be combined with the power from the generator stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical power system 200 as described herein.

Further, the power converter assembly 210 may be coupled in electronic data communication with the turbine controller 202 and/or a separate or integral converter controller 262 to control the operation of the rotor-side power converter 220 and the line-side power converter 222. For example, during operation, one or more of the controllers 202, 262 may be configured to receive one or more measurement signals from the sensors 252, 254, 256, 258. Thus, the controllers 202, 262 may be configured to monitor and control at least some of the operational variables associated with the wind turbine 100 via the sensors 252, 254, 256, 258.

In the illustrated embodiment, each of the sensors 252, 254, 256, 258 may be electrically coupled to each one of the three phases of the power grid bus 242. Alternatively, the sensors 252, 254, 256, 258 may be electrically coupled to any portion of electrical power system 200, such as the DC link 244, that facilitates operation of electrical power system 200 as described herein.

It should also be understood that any number or type of sensors may be employed within the wind turbine 100 and at any location. For example, the sensors 252, 254, 256, 258 may be current or voltage transformers, shunt sensors, rogowski coils, Hall Effect current or voltage sensors, Micro Inertial Measurement Units (MIMUs), and/or any other suitable voltage or electric current sensors now known or later developed in the art. Thus, the converter controller 262 is configured to receive one or more feedback signals from the sensors 252, 254, 256, 258. In addition, the converter controller 262 may be configured with any of the features described herein in regards to the main controller 202. Further, the converter controller 262 may be separate from or integral with the main controller 202. As such, the converter controller 262 is configured to implement the various method steps as described herein and may be configured similar to the turbine controller 202.

Figure 4:
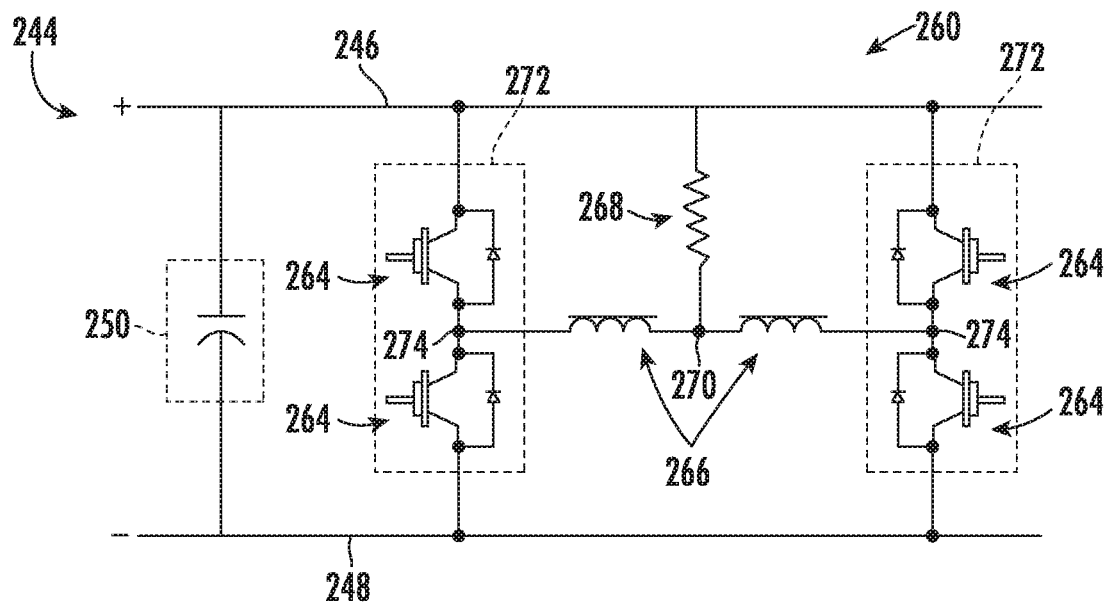
FIG. 4 illustrates a schematic diagram of one embodiment of a dynamic brake assembly according to the present disclosure.
Figure 5:
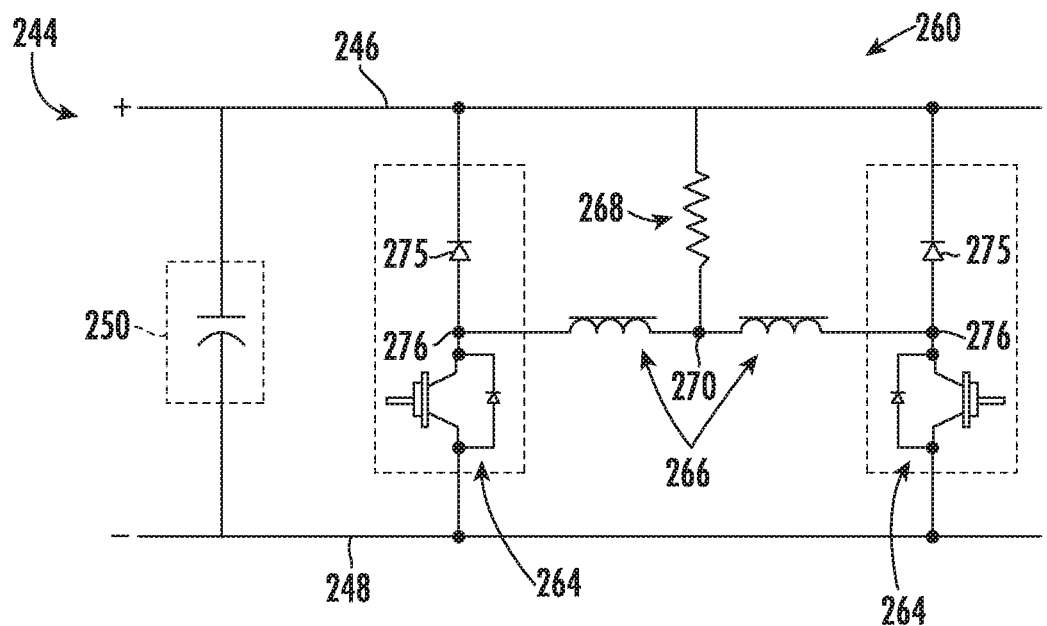
FIG. 5 illustrates a schematic diagram of another embodiment of a dynamic brake assembly according to the present disclosure.

Referring now to FIGS. 4-11, schematic diagrams of various embodiments of the dynamic brake assembly 260 according to the present disclosure are illustrated. More specifically, as shown, the dynamic brake assembly 260 is electrically coupled to the DC link 244 between the positive and negative rails 246, 248. Though the figures generally illustrate the dynamic brake assembly 260 connected to the positive rail 246, it should be understood that the dynamic brake assembly 260 may also be coupled to the negative rail 248. Further, as shown, the dynamic brake assembly 260 includes a plurality of switching devices 264 connected in parallel. For example, as shown in the illustrated embodiments, the switching devices 264 are insulated-gate bipolar transistors (IGBTs). In additional embodiments, the switching devices 264 may also include one or more diodes. In addition, as shown, the dynamic brake assembly 260 includes a plurality of inductors 266 electrically coupled between the switching devices 264. In addition, as shown in FIGS. 4 and 5, the dynamic brake assembly 260 may include at least one resistor 268 electrically coupled to a node 270 positioned between the inductors 266.

As shown particularly in FIG. 4, the plurality of switching devices 264 may be arranged in a plurality of pairs 272 of switching devices 264 connected in parallel. In such embodiments, as shown, each of the plurality of inductors 266 may be connected to nodes 274 between first and second switching devices 264 of each of the plurality of pairs of switching devices 272. Alternatively, as shown in FIG. 5, each of the plurality of inductors 266 may be connected to nodes 276 associated with separate switching devices 264 that are connected in parallel. In addition, as shown in FIG. 5, the dynamic brake assembly 260 may also include a freewheel diode 275 connected in series with each of the separate switching devices 264. Further, each of the plurality of inductors 266 may be connected in parallel with the resistor(s) 268.

Figure 6:
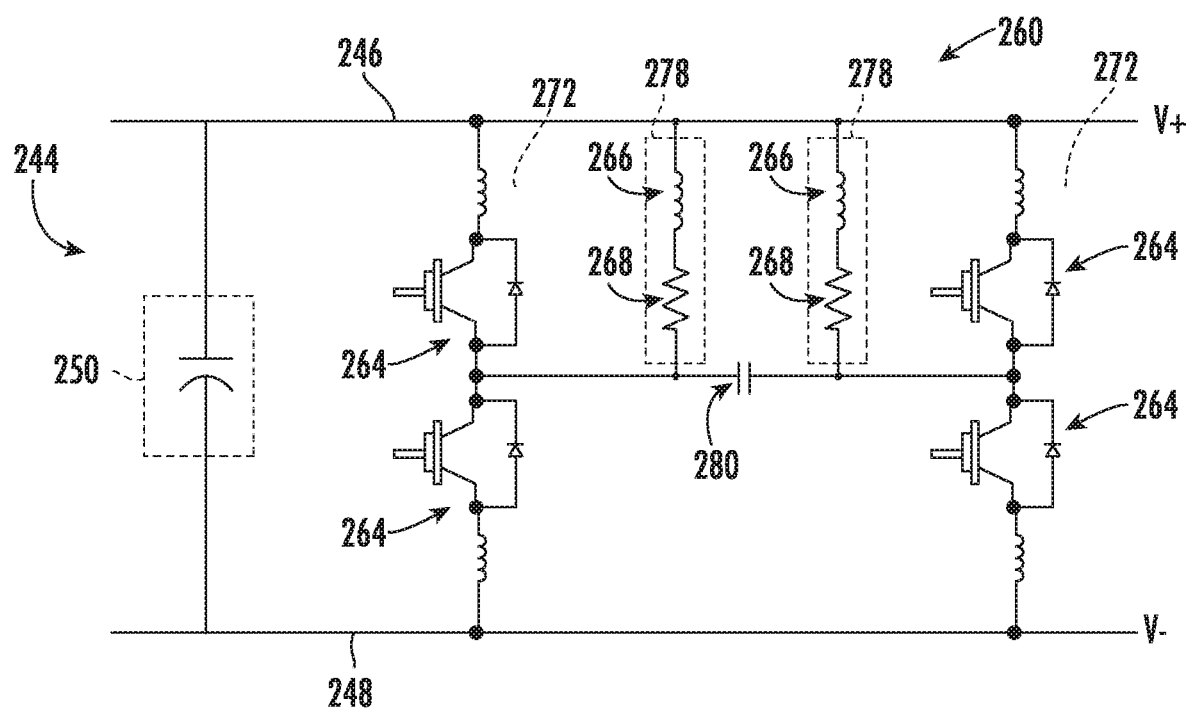
FIG. 6 illustrates a schematic diagram of yet another embodiment of a dynamic brake assembly according to the present disclosure.
Figure 7:
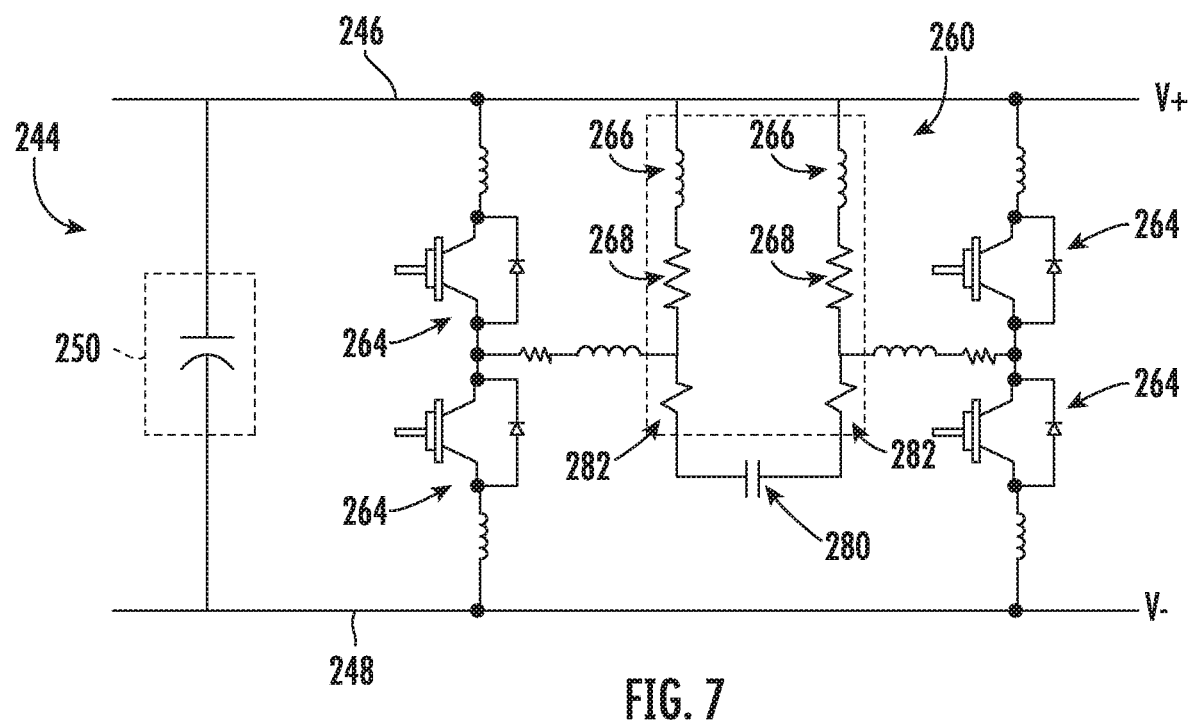
FIG. 7 illustrates a schematic diagram of still another embodiment of a dynamic brake assembly according to the present disclosure.
Figure 8:
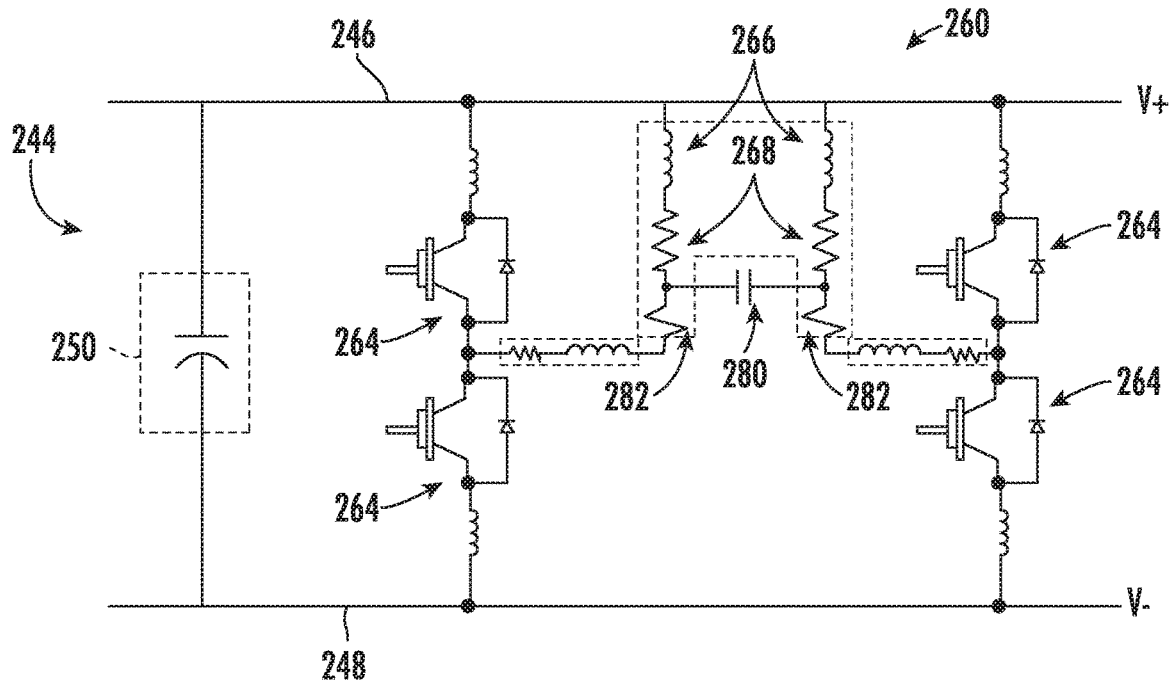
FIG. 8 illustrates a schematic diagram of a further embodiment of a dynamic brake assembly according to the present disclosure.

Referring now to FIGS. 6-8, the dynamic brake assembly 260 may include a plurality of resistors 268. In such embodiments, as shown particularly in FIG. 6, each of the plurality of resistors 268 may be connected in series with one of the plurality of inductors 266 between the switching devices 264 to form a plurality of dynamic brake circuits 278. Thus, as shown in FIGS. 6-8, the dynamic brake assembly 260 may further include at least one snubber capacitor 280 electrically coupled between the plurality of dynamic brake circuits 278. In such embodiments, the addition of the snubber capacitor 280 between the two dynamic brake circuits is configured to change the operation of the circuit by allowing significant reduction of the turn-off switching loss. For example, in the illustrated circuit, the turn-on of the switching devices 264 can be simultaneous, whereas turn-off can be staggered, such that one switching device turns off before the other.

In addition, as shown in FIG. 7, the dynamic brake assembly 260 may also include at least one additional resistor 282 connected in series with the snubber capacitor 280. More specifically, as shown, the dynamic brake assembly 260 includes two additional resistors 282 connected in series on opposing sides of the snubber capacitor 280. In another embodiment, the dynamic brake assembly 260 may include at least one additional resistor 282 connected in parallel with the snubber capacitor 280. More specifically, as shown in FIG. 8, the dynamic brake assembly 260 includes two additional resistors 282 connected in parallel with the snubber capacitor 280.

Figure 9:
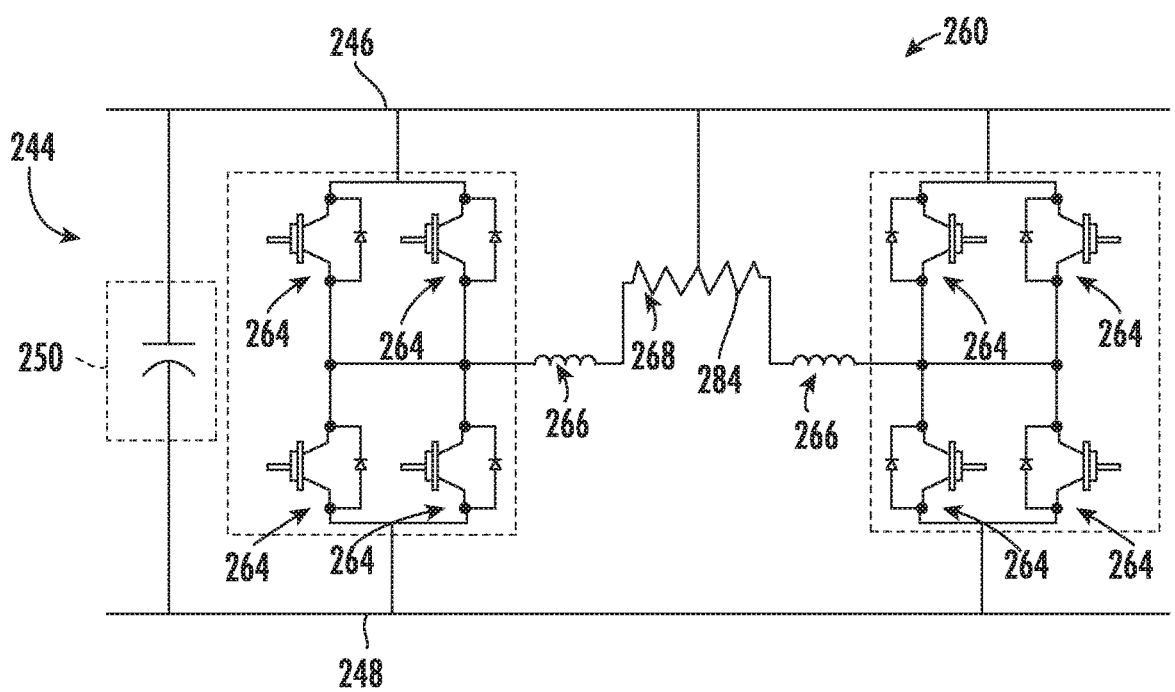
FIG. 9 illustrates a schematic diagram of another embodiment of a dynamic brake assembly according to the present disclosure.
Figure 10:
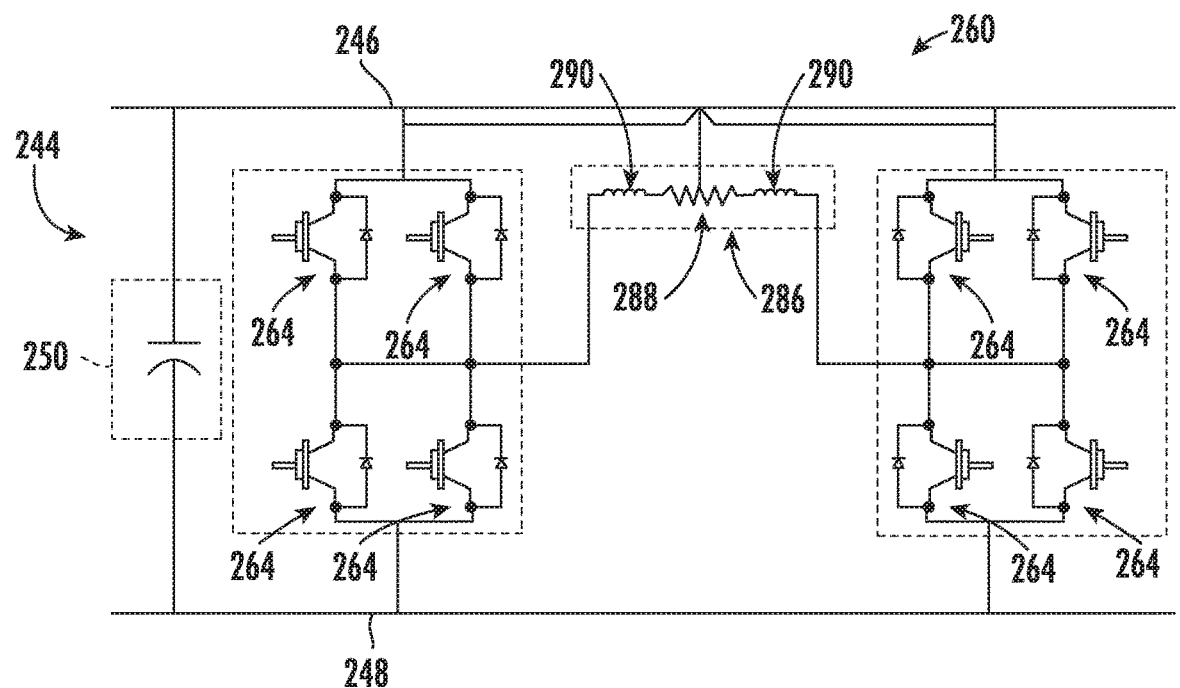
FIG. 10 illustrates a schematic diagram of yet another embodiment of a dynamic brake assembly according to the present disclosure.

Referring now to FIGS. 9 and 10, the resistor(s) 268 of the dynamic brake assembly 260 may include a split resistor 284, i.e. one that divides voltage between multiple routes. For example, as shown particularly in FIG. 9, at least one inductor 266 is connected to each connection end of the split resistor 284 to the dynamic brake phase module. In addition, as shown in FIG. 9, such inductors 266 are separate components in the circuit. In an alternative embodiment, as shown in FIG. 10, the dynamic brake assembly 260 includes a plurality of switching devices 264 connected in parallel with at least one resistance-inductance component 286 electrically coupled between the plurality of switching devices 264. In such embodiments, the resistance-inductance component 286 is a single component having both resistance 288 and inductance 290 capabilities, i.e. in separate sections of the component.

Figure 11:
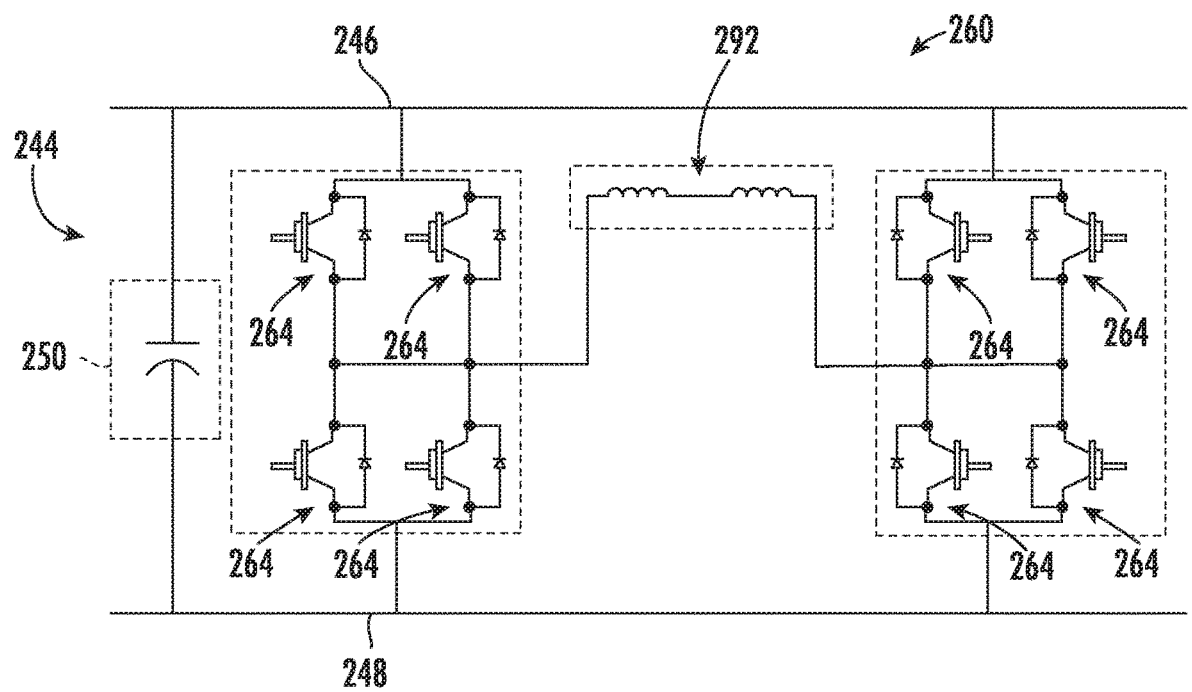
FIG. 11 illustrates a schematic diagram of still another embodiment of a dynamic brake assembly according to the present disclosure.

Referring now to FIG. 11, a schematic diagram of yet another embodiment of the dynamic brake assembly 260 according to the present disclosure is illustrated. As shown, the dynamic brake assembly 260 includes a plurality of switching devices 264 connected in parallel with an inductance component 292 electrically coupled between the switching devices 264. In such embodiments, the inductance component 292 is a single component having inductance capabilities that also has specified and controlled resistance. In such embodiments, the inductance and resistance are distributed in the composition of the component.

Figure 12:
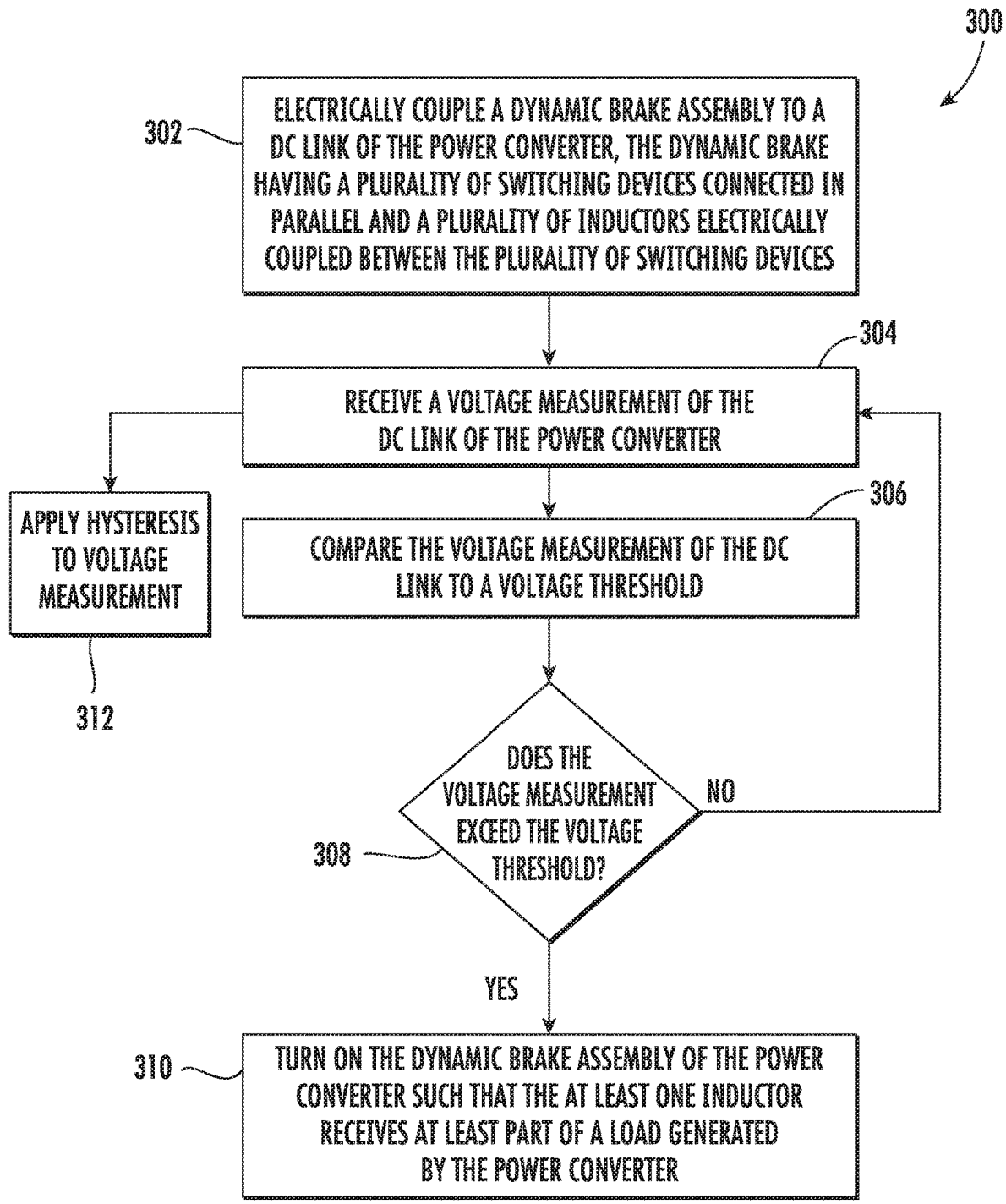
FIG. 12 illustrates a flow diagram of one embodiment of a method for controlling peak voltage of a DC link of a power converter of an electrical power system connected to a power grid with minimal switching losses according to the present disclosure.

Referring now to FIG. 12, a flow diagram of one embodiment of a method 300 for controlling peak voltage of a DC link of a power converter of an electrical power system connected to a power grid with minimal switching losses is illustrated. In general, the method 300 will be described herein with reference to the wind turbine 100 and dynamic brake assembly 260 shown in FIGS. 1-11. However, it should be appreciated that the disclosed method 300 may be implemented with wind turbines having any other suitable configurations. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 13:
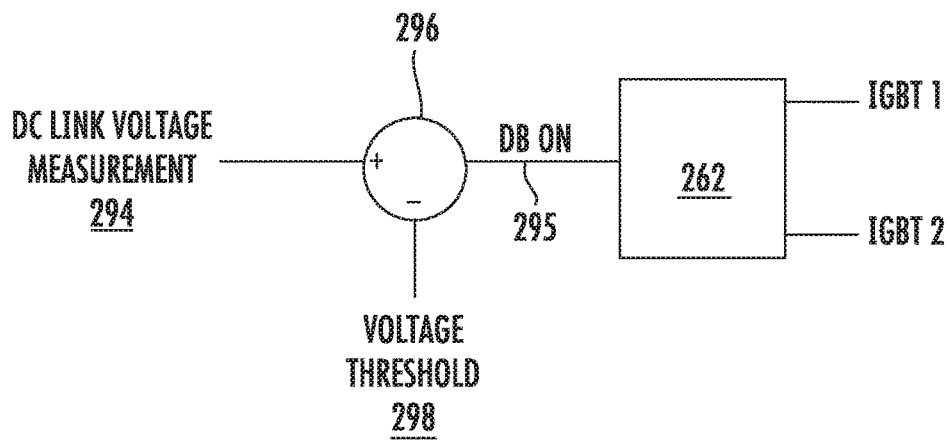
FIG. 13 illustrates a simplified, schematic diagram of one embodiment of a control scheme for a dynamic brake assembly according to the present disclosure.

As shown at (302), the method 300 includes electrically coupling the dynamic brake assembly 260 (such as any of the embodiments illustrated in FIGS. 4-11, to the DC link 244 of the power converter 210. As shown at (304), the method 300 includes receiving a voltage measurement of the DC link 244 of the power converter 210. For example, as shown in FIG. 13, a schematic diagram of one embodiment of a control scheme that may be implemented by one of the controllers described herein 202, 262 is illustrated. As shown, the controller 202, 262 receives the voltage measurement 294 via comparator 296. Referring back to FIG. 12, as shown at (312), the method 300 may also include applying hysteresis to the voltage measurement 294.

In addition, as shown at (306), the method 300 further includes comparing the voltage measurement 294 of the DC link 244 to a voltage threshold 298. For example, as shown in FIG. 13, the comparator 296 is configured to compare the voltage measurement 294 and the voltage reference 298 or threshold. Referring back to FIG. 12, as shown at (308), the controller 202, 262 is configured to determine whether the voltage measurement 294 is equal to or exceeds the voltage threshold 298. If so, as shown at (310), the method 300 includes turning on the dynamic brake assembly 260 of the power converter 210 such that the inductor(s) 266 receives at least part of a load generated by the power converter 210. More specifically, as shown in the illustrated embodiment of FIG. 13, the controller 202 may send an "ON" signal 295 to the converter controller 262 such that the converter controller 262 can send appropriate gating commands to the switching devices 264 (i.e. IGBT 1 and IGBT 2). More specifically, in certain embodiments, the controller 202, 262 may alternate on-delays and off-delays of the switching devices 264 to optimize sharing of a load between the switching devices 264.

In further embodiments, such as those that include the snubber capacitor 280, the controller 202, 262 may simultaneously turn on the switching devices 264 to optimize sharing of a load between the switching devices 264. As such, there are minimal to no switching losses at turn on. Being a primarily resistive load, the load current is zero when the switching devices 264 turn on, allowing a zero-current turn-on with no switching loss, as long as both switching devices 264 can be previously turned off long enough to allow the load current to drop to zero.

In addition, the controller 202, 262 may stagger turn-off commands for the switching devices 264 such that each switching device turns off at a different time. As such, the first switching device 264 that turns off will have zero (or much reduced) switching loss because the load current will shift into the capacitor 280 during the switching event. Hence, the capacitor 280 becomes a turn-off snubber circuit. The second switching device 264 that turns off will have reduced switching loss (nearly zero) because the capacitor 280 will again act as a turn-off snubber. It may be advantageous, but not necessary, to operate the turn-off of the switching devices 264 in a way to alternate the sequence for every other turn-off event, (one switching device 264 turns off first, then the other), to better balance their switching, conduction and diode losses.

Figure 14:
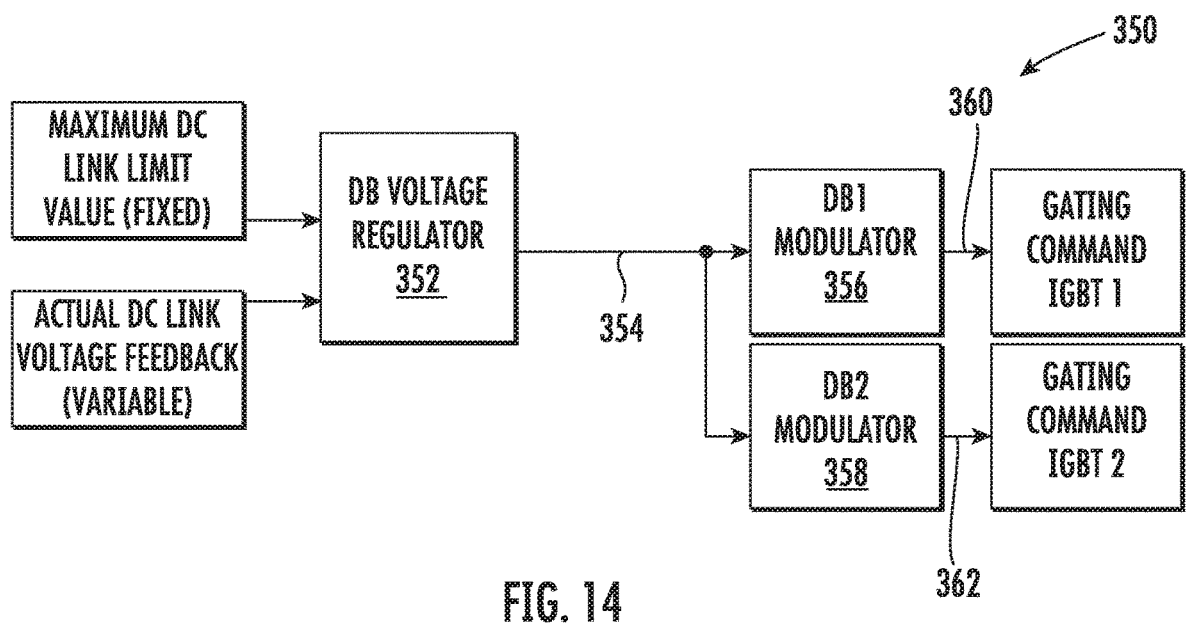
FIG. 14 illustrates a detailed, schematic diagram of another embodiment of a control scheme for a dynamic brake assembly according to the present disclosure.

Referring now to FIG. 14, a schematic diagram of one embodiment of a detailed control scheme 350 for the dynamic brake assembly 260 described herein according to the present disclosure is illustrated. As shown, a dynamic brake (DB) voltage regulator 352 (such as a proportional-integral regulator) receives a maximum DC link limit value (e.g. a fixed voltage threshold) and an actual DC link voltage feedback signal (i.e. a variable value). The voltage regulator 352 then generates an output signal 354 that can be received and used by a plurality of dynamic brake modulators 356, 358 for generating respective gating commands 360, 362 for first and second switching devices 264 (e.g. IGBT 1 and IGBT 2).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power converter assembly for an electrical power system connected to a power grid, the power converter assembly comprising:
    a rotor-side converter configured for coupling to a generator rotor of a generator of the electrical power system;
    a line-side converter electrically coupled to rotor-side converter via a DC link, the line-side converter configured for coupling to the power grid;
    at least one sensor configured to monitor at voltage parameter of the DC link; and,
    a dynamic brake assembly electrically coupled to the DC link, the dynamic brake assembly comprising a plurality of switching devices connected in parallel and a plurality of inductors electrically coupled between the plurality of switching devices,
    wherein, when the voltage parameter is at or above a voltage threshold, the dynamic brake assembly is configured to turn on such that the plurality of inductors receives at least part of a load generated by the power converter assembly.

2. The power converter assembly of claim 1, wherein the dynamic brake assembly further comprises a resistor electrically coupled to a node positioned between the plurality of inductors.

3. The power converter assembly of claim 2, wherein the resistor comprises a split resistor.

4. The power converter assembly of claim 2, wherein the plurality of switching devices may be arranged in a plurality of pairs of switching devices connected in parallel.

5. The power converter assembly of claim 4, wherein each of the plurality of inductors are connected to nodes between first and second switching devices of each of the plurality of pairs of switching devices.

6. The power converter assembly of claim 2, wherein each of the plurality of inductors is connected in parallel with the resistor.

7. The power converter assembly of claim 1, wherein the dynamic brake assembly further comprises a plurality of resistors, each of the plurality of resistors being connected in series with one of the plurality of inductors between the plurality of switching devices to form a plurality of dynamic brake circuits.

8. The power converter assembly of claim 7, wherein the dynamic brake assembly further comprises at least one snubber capacitor electrically coupled between the plurality of dynamic brake circuits.

9. The power converter assembly of claim 8, wherein the dynamic brake assembly further comprises at least one additional resistor connected in series with the snubber capacitor.

10. The power converter assembly of claim 9, wherein the dynamic brake assembly further comprises at least one additional resistor connected in parallel with the snubber capacitor.

11. The power converter assembly of claim 1, wherein the plurality of switching devices comprise insulated-gate bipolar transistors (IGBTs).

12. The power converter assembly of claim 1, wherein the electrical power system is part of a wind turbine power system, and the generator comprises a doubly-fed induction generator (DFIG).

13. A power converter assembly for an electrical power system connected to a power grid, the power converter assembly comprising:
    a rotor-side converter configured for coupling to a generator rotor of a generator of the electrical power system;
    a line-side converter electrically coupled to rotor-side converter via a DC link, the line-side converter configured for coupling to the power grid;
    at least one sensor configured to monitor at voltage parameter of the DC link; and,
    a dynamic brake assembly electrically coupled to the DC link, the dynamic brake assembly comprising a plurality of switching devices connected in parallel and at least one resistance-inductance component electrically coupled between the plurality of switching devices,
    wherein, when the voltage parameter is at or above a voltage threshold, the dynamic brake assembly is configured to turn on such that the at least one resistance-inductance component receives at least part of a load generated by the power converter assembly.

14. A method for controlling peak voltage of a DC link of a power converter of an electrical power system connected to a power grid with minimal switching losses, the method comprising:
    electrically coupling a dynamic brake assembly to a DC link of the power converter, the dynamic brake having a plurality of switching devices connected in parallel and a plurality of inductors electrically coupled between the plurality of switching devices;
    receiving a voltage measurement of the DC link of the power converter;
    comparing the voltage measurement of the DC link to a voltage threshold;
    when the voltage measurement is at or above the voltage threshold, turning on the dynamic brake assembly of the power converter such that the at least one inductor receives at least part of a load generated by the power converter.

15. The method of claim 14, further comprising applying hysteresis to the voltage measurement.

16. The method of claim 14, wherein turning on the dynamic brake assembly of the power converter further comprises determining at least one gating command for each of the plurality of switching devices.

17. The method of claim 16, wherein determining the at least one gating command for each of the plurality of switching devices further comprises time-shifting on-delays and off-delays of the plurality of switching devices to optimize sharing of a load between the plurality of switching devices.

18. The method of claim 14, wherein the dynamic brake assembly further comprises a plurality of resistors and a plurality of inductors coupled between the plurality of switching devices, each of the plurality of resistors connected in series with one of the plurality of inductors to form a plurality of dynamic brake circuits, the dynamic brake assembly further comprising at least one snubber capacitor coupled between the plurality of dynamic brake circuits.

19. The method of claim 18, wherein determining the at least one gating command for each of the plurality of switching devices further comprises:
- simultaneously turning on the plurality of switching devices to optimize sharing of a load between the plurality of switching devices; and,
- time-shifting turn-off commands for the plurality of switching devices such that each switching device turns off at a different time.

20. The method of claim 14, wherein the dynamic brake assembly further comprises a resistor electrically coupled to a node positioned between the plurality of inductors.

* * * * *